(12) United States Patent
Lian et al.

(10) Patent No.: US 8,593,512 B2
(45) Date of Patent: Nov. 26, 2013

(54) DEVICE AND METHOD FOR SCANNING AN OBJECT ON A WORKING SURFACE

(75) Inventors: Yam Fei Lian, Singapore (SG); Kin Fui Chong, Singapore (SG); Seah Seang Yong, Singapore (SG); Wei Lit Wilfred Leung, Singapore (SG); Thuan Hwei Tan, Singapore (SG)

(73) Assignee: Creative Technology Ltd, Singapore (SG)

( * ) Notice: Subject to any disclaimer, the term of this patent is extended or adjusted under 35 U.S.C. 154(b) by 947 days.

(21) Appl. No.: 12/701,469

(22) Filed: Feb. 5, 2010

(65) Prior Publication Data

US 2011/0193944 A1   Aug. 11, 2011

(51) Int. Cl.
*H04N 7/18* (2006.01)

(52) U.S. Cl.
USPC .............................................. 348/61; 348/63

(58) Field of Classification Search
USPC ...................................................... 348/61–63
See application file for complete search history.

(56) References Cited

U.S. PATENT DOCUMENTS

| | | | |
|---|---|---|---|
| 6,493,469 B1 * | 12/2002 | Taylor et al. | 382/284 |
| 7,298,921 B2 * | 11/2007 | Tinn et al. | 382/294 |
| 7,586,655 B1 * | 9/2009 | Uhlik et al. | 358/497 |

* cited by examiner

*Primary Examiner* — Andy Rao
(74) *Attorney, Agent, or Firm* — Creative Technology Ltd (57) ABSTRACT

A device and method for scanning an object on a working surface, the device comprising: a body located adjacent to the working surface; two or more cameras mounted on the body at a location elevated adjacently above the working surface for capturing images of the object on the working surface, the two or more cameras being angled such that their range of image captures overlap and the common overlapping region of the range of image captures of the two or more cameras corresponds with the size of the working surface, the two or more cameras being spaced apart such that each of the two or more cameras captures a different angle of the common overlapping region; and a processing unit capable of correcting skewed images of the working surface captured by the two or more cameras and capable of converting the images captured by the two or more cameras into a three dimensional image.

24 Claims, 6 Drawing Sheets

DEVICE AND METHOD FOR SCANNING AN OBJECT ON A WORKING SURFACE

FIELD OF INVENTION

The present invention relates to a device and method for scanning an object on a working surface.

BACKGROUND

Scanning a document to obtain a digital copy of the document is one of the many routine tasks in the modern-day office.

Typically, a flatbed scanner is used to scan the documents. A flatbed scanner usually includes a glass pane, under which there is a bright light for illuminating the pane, and a moving sensor array for performing the scanning. Objects to be scanned are placed face down on the glass pane and an opaque cover is lowered over the object and the glass pane to exclude ambient light. When the scanning process starts, the sensor array moves across the pane, reading the entire area where the object resides. An inconvenience of the flatbed scanner is that the user has to be present to lift and lower the opaque cover for the scanning process. Furthermore, the flatbed scanner usually takes up quite some space.

A portable solution is to carry out the scanning process using hand held document scanners. Hand held document scanners are manual devices that are dragged across the surface of the document or image to be scanned. However, scanning documents in this manner requires a steady hand, as an uneven scanning rate would produce distorted scans.

It is further noted that the usage of flat-bed and hand held scanners are restricted only to scanning objects in two dimensions.

A need therefore exists to provide a device and method for scanning an object on a working surface that addresses at least the above-mentioned problems.

SUMMARY

In accordance with one aspect of the present invention, there is provided a device for scanning an object on a working surface, the device comprising: a body located adjacent to the working surface; two or more cameras mounted on the body at a location elevated adjacently above the working surface for capturing images of the object on the working surface, the two or more cameras being angled such that their range of image captures overlap and the common overlapping region of the range of image captures of the two or more cameras corresponds with the size of the working surface, the two or more cameras being spaced apart such that each of the two or more cameras captures a different angle of the common overlapping region; and a processing unit capable of correcting skewed images of the working surface captured by the two or more cameras and converting the images captured by the two or more cameras into a three dimensional image.

The two or more cameras may be spaced apart from one another and disposed along a horizontal axis substantially parallel to the working surface, wherein the two or more cameras are pivotable synchronously about the device and rotatable synchronously about the horizontal axis.

The device may comprise one or more feet located at the bottom of the body where the device rests on, the one or more feet being use as markers to facilitate the alignment of a document on the working surface for scanning.

The device may further comprise an indicia located on the body to indicate the position to place the midpoint of a document on the working surface for scanning.

The body of the device may comprise a screen for displaying the captured images of the object, the screen comprising screen markers for assisting alignment of the object in the captured images.

The two or more cameras may be spaced apart by substantially 6.35 cm.

The two or more cameras may be arranged to capture part of a lower portion of the body adjacent to the working surface to provide reference for the processing unit to identify the working surface for correcting skewed images.

The lower portion of the body adjacent to the working surface may be of a uniform colour.

The two or more cameras may be configurable to capture images of documents in portrait or landscape arrangement on the working surface.

The two or more cameras may be substantially identical.

The device may comprise a sound producing device for producing sound when there is alignment of objects in the working surface.

The device may comprise a laser pointer for marking out the working surface to facilitate placement of the object.

In accordance with another aspect of the present invention, there is provided a method for scanning an object on a working surface, the method comprising: capturing images of the object on the working surface using two or more cameras mounted on a body at a location elevated adjacently above the working surface, the body being located adjacent to the working surface; angling the two or more cameras such that their range of image captures overlap and the common overlapping region of the range of image captures of the two or more cameras corresponds with the size of the working surface; spacing apart the two or more cameras such that each of the two or more cameras captures a different angle of the common overlapping region; and correcting skewed images of the working surface captured by the two or more cameras, or converting the images captured by the two or more cameras at into a three dimensional image.

The method may further comprise spacing apart the two or more cameras from one another and disposing them along a horizontal axis substantially parallel to the working surface, wherein the two or more cameras are pivotable synchronously about the device and rotatable synchronously about the horizontal axis.

The method may further comprise facilitating the alignment of a document on the working surface for scanning using one or more feet located at the bottom of the body.

The method may further comprise indicating the position to place the midpoint of a document on the working surface for scanning using indicia located at the foot of the body.

The method may further comprise displaying the captured images of the object on a screen and assisting alignment of the object in the captured images using screen markers on the screen.

The method may further comprise spacing apart the two or more cameras by substantially 6.35 cm.

The method may further comprise arranging the two or more cameras to capture part of a lower portion of the body adjacent to the working surface to provide reference for the processing unit to identify the working surface for correcting skewed images.

The lower portion of the body adjacent to the working surface may be of a uniform colour.

The method may further comprise configuring the two or more cameras to capture images of documents in portrait or landscape arrangement on the working surface.

The two or more cameras may be substantially identical.

The method may further comprise producing sound when there is alignment of objects in the working surface.

The method may further comprise facilitating placement of the object by marking out the working surface using a laser pointer.

BRIEF DESCRIPTION OF THE DRAWINGS

Embodiments of the invention will be better understood and readily apparent to one of ordinary skill in the art from the following written description, by way of example only and in conjunction with the drawings, in which.

DETAILED DESCRIPTION

Figure 1:
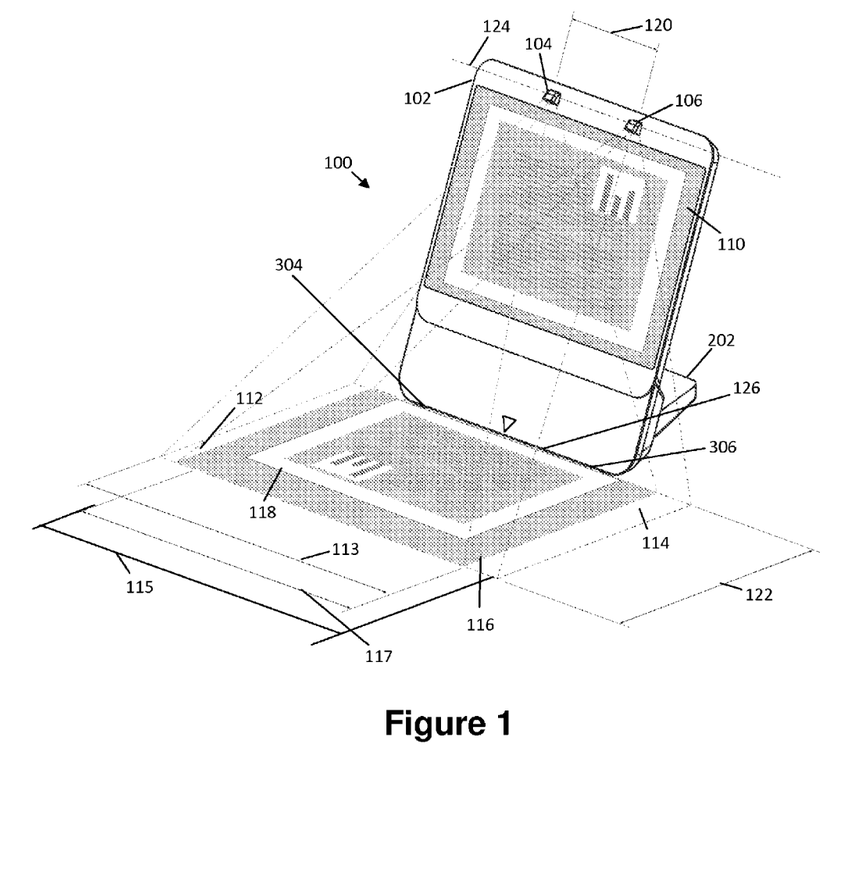
FIG. 1 shows a perspective view of an example embodiment of the present invention.
Figures 2, 3:
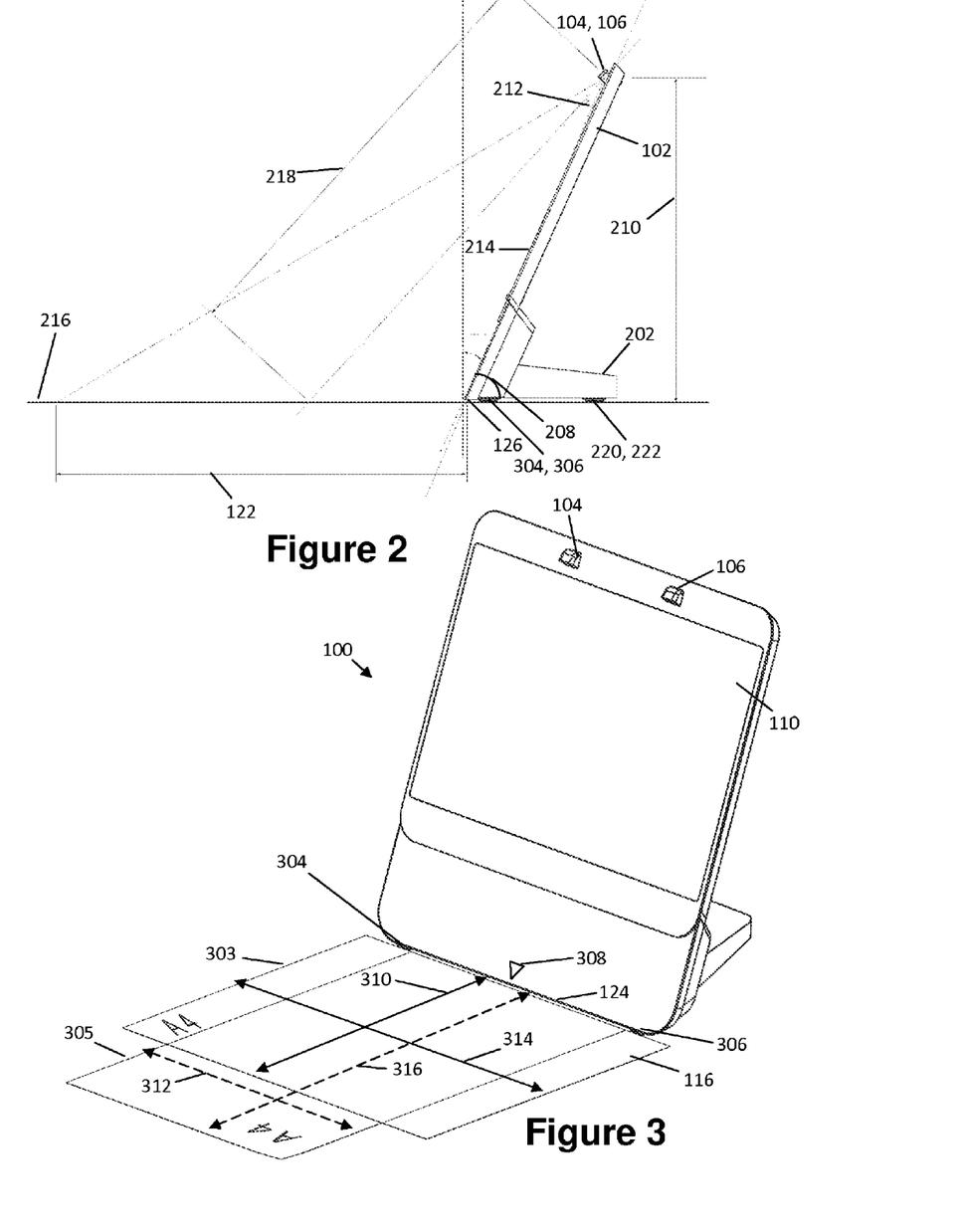
FIG. 2 shows a side view of the example embodiment of the present invention.
FIG. 3 shows a perspective view of the example embodiment of the present invention.

With reference to FIGS. 1 and 2, there is provided in an example embodiment of the present invention a device 100 for scanning objects placed on a rectangular planar working surface 116. The rectangular planar working surface 116 is an area caught on cameras 104 and 106 mounted on the device 100. Scanning of the objects in the working surface 116 is made possible by cameras 104 and 106.

In the example embodiment, the captured area corresponding to the working surface 116 of the cameras 104 and 106 is larger than a standard A4 paper document (i.e. length 297 mm and width 210 mm) so that documents with A4 paper size or smaller could be fully captured by the cameras 104 and 106 for scanning. The expression "scanning" used herein in conjunction with objects refer to capturing images of objects and translating the images into a digital form recognisable by a computer device, e.g. portable computers, desktop computers, digital mobile devices and the like. Related words such as "scanned" and "scan" shall be understood accordingly.

In the example embodiment, the device 100 is placed on a horizontal surface 216. The device 100 has an inclined planar body 102 arranged such that its front facing planar surface is slanted at an acute angle 208 from the horizontal surface 216. In the example embodiment, the acute angle 208 is about 66 degrees. The body 102 has a base 202 extending from the body 102 and lying horizontally on the surface 216 for supporting the device 100. The working surface 116 is located on the horizontal surface 216 adjacent to the foot of the body 102 of the device 100. An object 118 to be scanned is placed on the working surface 116. In the example embodiment, the object 118 is a piece of A4 size paper document. The two cameras 104 and 106 are mounted on the body 102 at a location elevated adjacently above the working surface 116. Images captured by the two cameras 104 and 106 at such angle would appear warped or skewed. As such, there is present a processing unit (not shown in FIG. 1, 602 in FIG. 6) residing internally of the device 100 for correcting skewed images captured by the two cameras 104 and 106. The processing unit (602 in FIG. 6) could be an integrated chip located on an electronic circuit board residing within the external casing of the device 100.

The body 102 has a screen 110 on its front facing planar surface for displaying the images captured by the two cameras 104 and 106. A user can preview or review images captured by the cameras 104 and 106 on the screen 110 with the help of an appropriate software with a Graphic User Interface. Prior to scanning, the user can adjust the positioning of the object 118 by looking at a preview of the captured images on the screen 110. The images captured by the cameras 104 and 106 may include the image captured by camera 104, the image captured by the camera 106 and the image capture of an overlapping region corresponding with the working surface 116 that is captured by both cameras 104 and 106. It is appreciated that the screen 110 could be a display based on Light Crystal Display, organic light-emitting diode (OLED), and the like. It may also include touch-screen technologies.

There are two front alignment feet 304 and 306 located at the bottom of the base 202 closer to the working surface 116. The front alignment feet 304 and 306 are used as markers to facilitate the alignment of paper documents for scanning. There is a gap 126 located between the base 202 and the horizontal surface 216 for inserting paper documents. Front alignment feet 304 and 306 are located slightly into the gap 126 with respect from the front facing planar surface of the body 102. There are two rear feet 220 and 222 located closer to the rearward end of the base 202. Rear feet 220 and 222 serve mainly as rear footing for the base 202. The front and rear feet 304, 306, 220 and 222 may be made of non-slip material.

The two cameras 104 and 106 are mounted at a location elevated adjacently above the working surface 116 by a distance m 210. The two cameras 104 and 106 are mounted along the same horizontal axis 124, which is parallel to the horizontal surface 216. In the example embodiment, m 210 is about 292 mm. The two cameras 104 and 106 are arranged to face toward the working surface 116 at an angle 212 from the front facing surface 214 of the body 102. In the example embodiment, the displacement 218 between the centre of the cameras' lens and the working surface 116 is about 338 mm, and the angle 212 is about 18 degrees. The two cameras 104 and 106 are spaced apart from each other by a distance $l$ 120. In the example embodiment, the distance $l$ 120 is about the distance between one's eyes (known as the intraocular distance) and is about 6.35 cm.

As a result of the body 102 being inclined and the lens of the two cameras 104 and 106 being mounted to face the working surface 116 at the angle 212 (18 degrees), the images captured by the two cameras 104 and 106 have varying depth of field and would appear to be warped or skewed. In the images captured, the portions of the object 118 nearer in distance to the two cameras 104 and 106 would appear larger than the portions of the object 118 at a distance further away from the two cameras 104 and 106. The processing unit (602 in FIG. 6) is configured to adjust the varying depth of field of the object 118 in the captured images and correct the skewed images such that they would appear to have a uniform depth of field.

In the example embodiment, the two cameras 104 and 106 are digital and substantially identical i.e. having similar or exactly the same parameter settings, so as to ensure that the scanned images turn out well or satisfactory. Examples of such parameter settings are camera size, same resolution, focal length, aperture size, shutter speed, sensitivity, lens type, etc.

In more detail, camera 104 captures a first area 112, and camera 106 captures a second area 114. The first and second area 112 and 114 overlap each other. The common overlapping region of the first and second areas, 112 and 114, corresponds with the working surface 116. In the example embodiment, the common overlapping region is large enough to fit the largest paper document that requires scanning.

By fusing the overlapping region of the two image capturing areas, i.e. the first and second areas, 112 and 114, the resultant image capture of the working surface 116 has improved resolution compared to capturing a single image using just one camera. The reason being the total digital information captured in two images is more than the digital information in just one captured image. With improved resolution, a corrected skewed image of the object 118 in the overlapping region can still turn out with good or satisfactory clarity even if the correction process results in lower resolution at the areas where the original skewed image has been stretched by the processing unit during the correction process. In the example embodiment, Super Resolution techniques are used to fuse the overlapping region of the first and second areas, 112 and 114, together to produce the resultant image of higher resolution. It is appreciated that Super Resolution techniques are known to a person skilled in the art.

FIG. 3 illustrates placing an A4 size document 302 in landscape arrangement 303 and portrait arrangement 305 for scanning using the device 100.

In the landscape arrangement 303, the A4 size document 302 is placed in the working surface 116 with its length parallel to the front planar surface of the body 102. The A4 size document 302 is pushed against the feet 304 and 306 to align the A4 size document 302 along the directions 314 of the length of the A4 size document 302. A label 308 (i.e. an indicia) located at the foot of the front surface of the device 100 between the two feet 304 and 306 is used as a marker to facilitate the alignment of the A4 size document 302 along the directions 314 of the length of the A4 size document 302. The label 308 helps to indicate the position to place the midpoint of the A4 size document 302 for the landscape arrangement 303. Likewise, the label 308 can be used to indicate the position to place the midpoint of the A4 size document 302 for the portrait arrangement 305.

In the portrait arrangement 305, the A4 size document 302 is placed in the working surface 116 with its width parallel to the front planar surface of the body 102. The two alignment feet 304 and 306 are used as markers to facilitate the alignment of the A4 size document 302 in portrait arrangement 305. The A4 size document 302 is inserted between the two feet 304 and 306 of the device 100 to align the A4 size document 302 along the directions 312 of the width of the A4 size document 302. In this case, alignment of the A4 size document 302 along the directions 316 of the length of the A4 size document 302 is done with the help of a real-time preview of the images captured by the cameras 104 and 106 on the screen 110. The screen 110 in this embodiment is configured to display as the preview, in real-time, the un-skewed or de-warped images of the working surface 116 captured by the cameras 104 and 106.

Figure 4A:
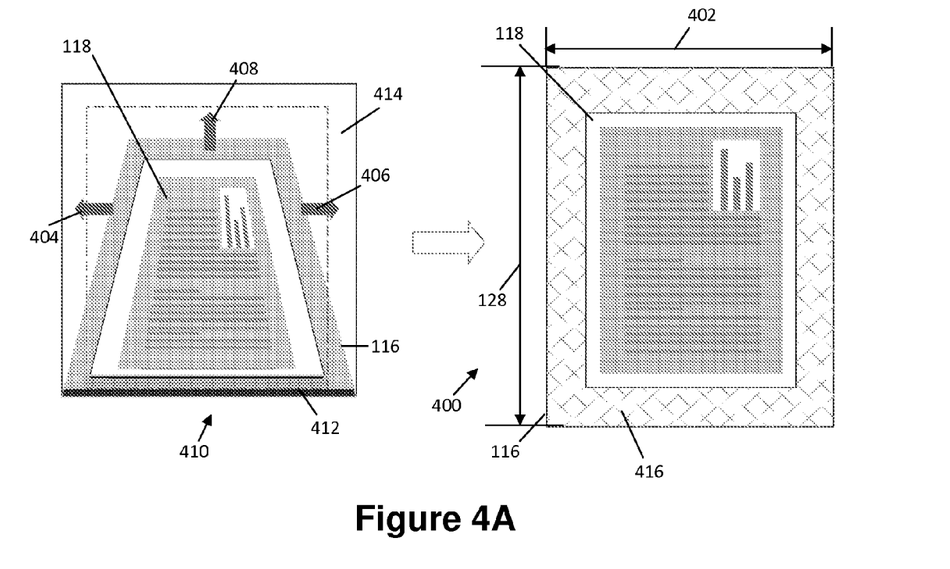
FIG. 4A shows images illustrating a de-warping process of the example embodiment of the present invention.

FIG. 4A shows a preview drawing 400 and a working drawing 410. The working drawing 410 illustrates how a skewed image of a paper document 118 is captured by both cameras 104 and 106 and corrected to obtain a scanned un-skewed or dewarped image having a uniform depth of field. It is noted that working drawing 410 is not being displayed on the screen 110. It serves to illustrate the de-warping process of the captured images of the working surface 116. Drawing 410 illustrates an image 414 of the overlapping region (i.e. the working surface 116) captured by the two cameras 104 and 106. The image 414 is generated by combining the two images captured by the respective cameras 104 and 106. Due to varying depth of field, the paper document 118 in the image 414 appears to be in the shape of a trapezium with its parallel sides appearing horizontally on the drawing page and with the longer parallel side located closer to the bottom of the image 414. During the correction process to correct the depth of field of the image, the overlapping region is stretched in a top direction 408 to lengthen the un-skewed image length vertically, and is stretched horizontally in a left direction 404 and right direction 406 to straighten the non-parallel sides of the trapezium. Drawing 400 shows the same captured image in drawing 410 after it has gone through the correction process. Drawing 400 is the preview drawing that would be displayed on the screen 110 for users of the device 100 to align the document. It is noted that the shaded portion 416 in drawing 400 is just screen filler and is not part of the processed image capture of the working surface 116. It is appreciated that in other example embodiments, the processed image capture of the working surface 116 could fill the entire screen 110. In drawing 410, the image 414 contains a thin rectangular portion 412 (shaded black colour in FIG. 4A). The thin rectangular portion 412 is the lowest portion of the body 102 adjacent to the working surface 116. The thin rectangular portion 412 is deliberately captured by the cameras 104 and 106 to provide reference for identifying the working surface 116. The thin rectangular portion 412 of the device 100 is deliberately dyed, painted or coated with a uniform colour, such as black in this case, so that it could be easily identified using software and removed. The thin rectangular portion 412 will be removed by the software of the device 100 so that the processed un-skewed image in drawing 400 that is shown to users will not display it.

Although only skew correction of the document 118 in portrait arrangement (e.g. 305 in FIG. 3) is illustrated in FIG. 4A, it is appreciated that the same correction process could be applied for the document in landscape arrangement (e.g. 303 in FIG. 3).

Figure 4B:
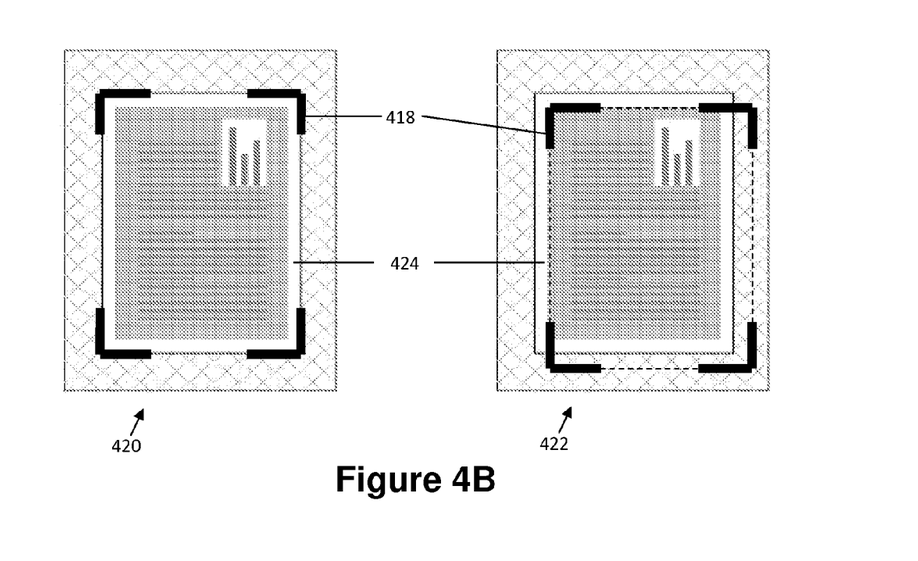
FIG. 4B shows images displayed in a display of the example embodiment of the present invention.

FIG. 4B illustrates the use of screen markers 418 to assist users to align a paper document 424 using the screen 110 of the device 100 in another example embodiment of the present invention. In FIG. 4B, there are an aligned drawing 420 and a misaligned drawing 422 showing the paper document 424 in proper alignment and misalignment respectively. There are screen markers 418 in both drawings 420 and 422. These screen markers 418 are alignment features provided to assist alignment using the screen 110.

In another example embodiment of the present invention, the device 100 may include a sound producing device, which will produce sound to alarm users when the paper document 424 is aligned, for example, when the edges of the paper document 424 are closely aligned to the screen markers 418. Detection can be done by using software to monitor the captured images of the paper document 424.

Figure 5:
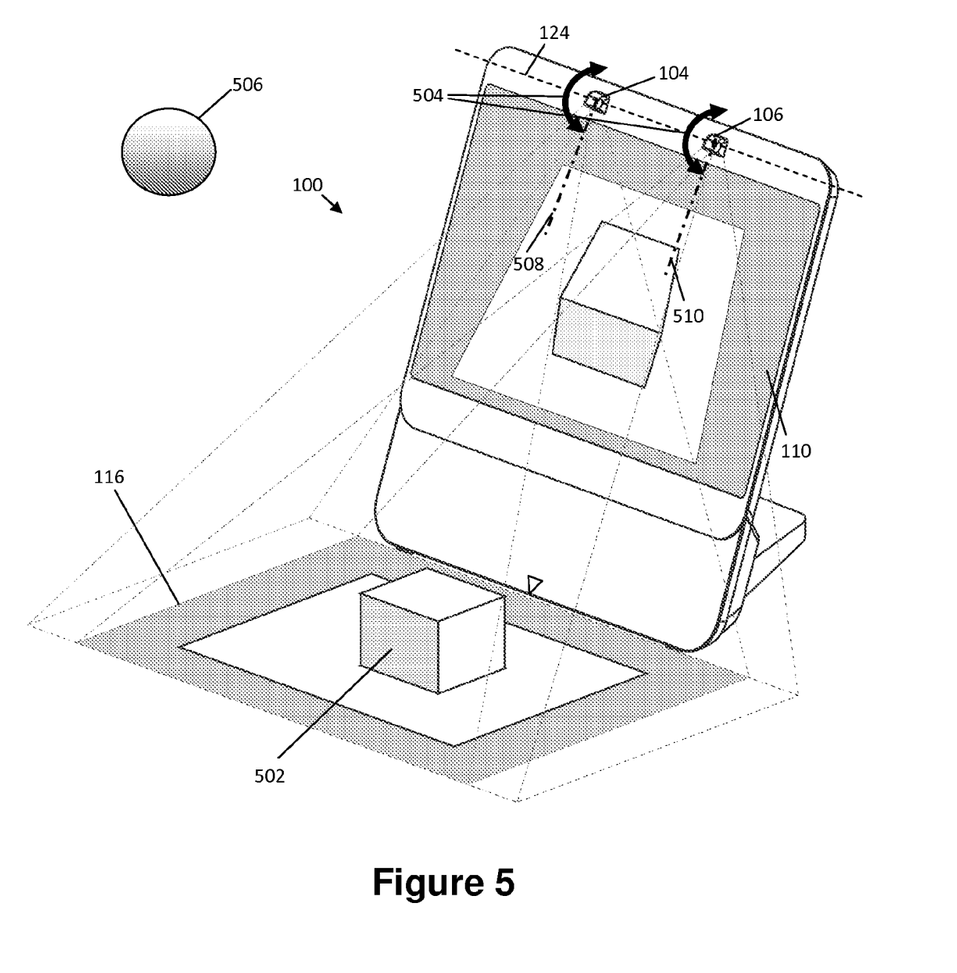
FIG. 5 shows a perspective view of the example embodiment of the present invention.

FIG. 5 illustrates using the device 100 described earlier with reference to the preceding figures to produce a 3D image (in other words, a stereoscopic image or stereogram) of an object 502. In the present example embodiment, the object 502 is a box and cameras 104 and 106 are located approximately 6.35 cm apart to capture images of the object 502 from two angles. It is known in stereoscopic techniques that in order to generate the 3D image of an object, at least two images of the object 502 should be captured at different angles. Furthermore, to produce 3D image close to how a human would perceive, the distance/120 between the two cameras 104 and 106 is preferably 6.35 cm, which is the intraocular distance.

The example embodiment described with reference to FIG. 5 may include a modification to enable both 2D and 3D scanning of objects, for instance, the round object 506, located above and outside the working surface 116 and facing the side of the device 100 comprising the two cameras 104, 106. Using FIG. 5 for illustration, the modification is to make the two cameras 104 and 106 pivotable synchronously by way of mechanical joints about the device 100 thereby making the two cameras 104 and 106 rotatable synchronously about the horizontal axis 124. It is appreciated that the design for such mechanical joints is known to a person skilled in the relevant art and would not be covered herein.

For illustration, in FIG. 5, the cameras 104 and 106 having the optical axes 508 and 510 respectively could be rotatable synchronously about the horizontal axis 124 by an angle 504 as shown. Angle 504 could range between 0 to 180 degrees. By making the two cameras 104 and 106 rotate synchronously, the two cameras 104 and 106 could capture a common overlapping region, such as the working surface 116, for the creation of 2D scans, and could capture object(s) (e.g. object 502 or 506) in the common overlapping region from two different angles (i.e. each camera capturing a different angle of the object) at the same instance for the creation of 3D scans. As the extent of skew distortion in the captured images would vary for different angles of rotation of the cameras 104 and 106 about the horizontal axis 124, the skew correction software mentioned previously could be configured to provide skew correction for different angles of rotation of the cameras 104 and 106 about the horizontal axis 124.

It is appreciated that another example embodiment of the present invention may have no screen (e.g. 110 in FIG. 1) to display images captured by the cameras (e.g. 104 and 106). In this case, the body (e.g. 102 in FIG. 1) may simply be a stand with a base for support and have cameras (e.g. 104 and 106) mounted at an elevated part of the body (e.g. 102 in FIG. 1) in the kind of arrangement described earlier with reference to FIGS. 1 to 5. Object alignment in this case would solely depend on indicators such as the feet 304, 306 and the label 308.

It is appreciated that example embodiments of the present invention may include two or more cameras mounted on the device (e.g. 100 in FIG. 1), preferably at equal spacing apart. The two or more cameras may have substantially identical parameter settings. The cameras (e.g. 104 and 106) may be mounted and angled on the device (e.g. 100 in FIG. 1) such that their range of image captures overlap and the common overlapping region corresponds with the working surface (e.g. 116 in FIG. 1). This enables normal 2D document scanning, as the captured image is generated by fusing all the images of the overlapping region captured by the respective cameras (e.g. 104 and 106) at the same instance. Furthermore, the cameras (e.g. 104 and 106) may be sufficiently spaced apart (e.g. by about 6.35 cm) on the device (e.g. 100 in FIG. 1) such that each of the cameras (e.g. 104 and 106) captures a different perspective (i.e. angle) of the common overlapping region from their mounted locations. This is required for 3D object scanning. In this manner, example embodiments of the present invention advantageously provide a device for both 2D and 3D scanning of an object on a working surface 116 with one system configuration. Other advantages include no need for lifting or closing an opaque cover to perform scanning like conventional flat bed scanners, and easier way to align an object for scanning because of alignment features like the screen (110 in FIG. 1) for previewing captured images, screen markers (418 in FIG. 4), the two feet (304 and 306 in FIG. 3), and the label (308 in FIG. 3) for document alignment.

It is appreciated that example embodiments of the invention could be used for scanning paper documents, photographs, drawings, objects to be converted into a stereogram (i.e. 3D image), and the like.

In some example embodiments of the present invention, the device 100 described with reference to the figures may include video conferencing features. There could be a graphical user interface operating on the device 100 that is configured to enable real time 2D or 3D object scanning operating as previously described during a video conference involving two or more parties. The device 100 could also be configured to allowing sending of scanned images to the parties in the video conference via an internet connection. In such an embodiment, the device 100 advantageously functions as a tool for real-time presentation and dissemination of documents or objects electronically to other parties in the video conference without disconnection of video conferencing communication with the parties involved.

Figure 6:
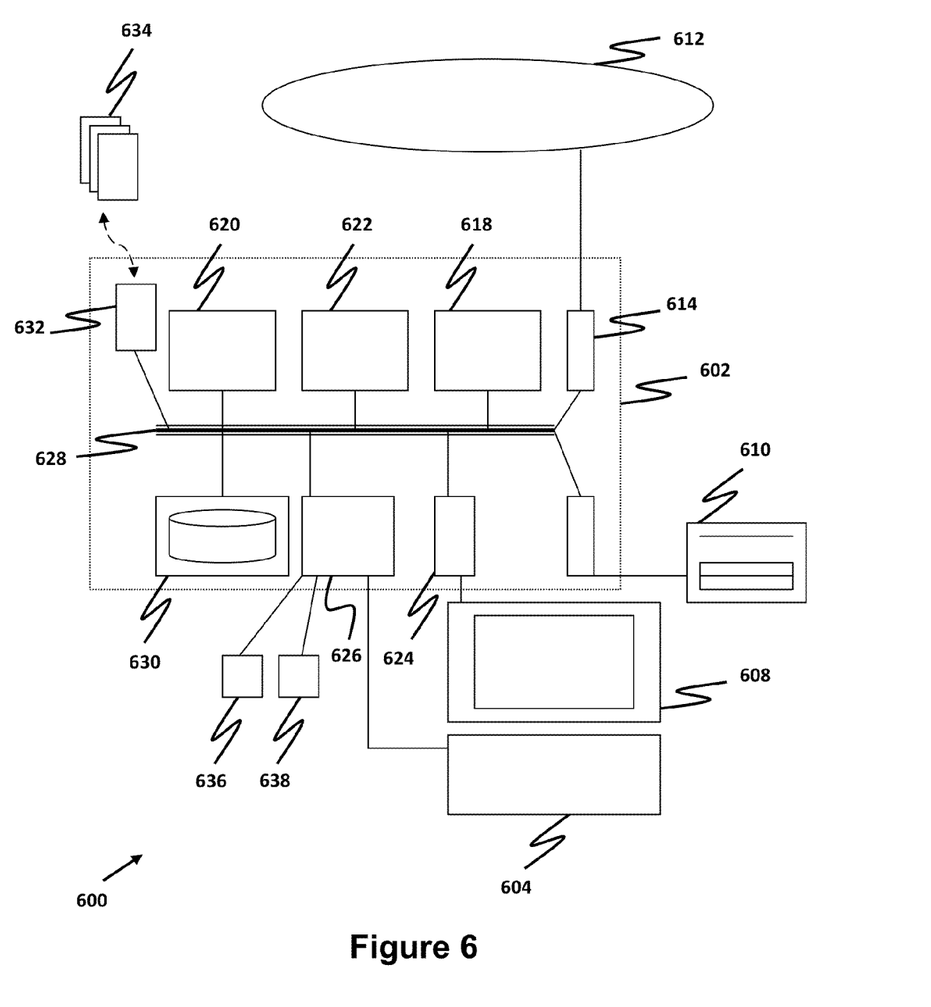
FIG. 6 is a schematic drawing of a computer system of an example embodiment of the present invention.

The device 100 of the example embodiment described earlier with reference to FIG. 1 may be a computer system 600, schematically shown in FIG. 6 in another example embodiment. There may be provided software, such as one or more computer programs being executed within the computer system 600, and instructing the computer system 600 to conduct some methods of the example embodiment, including for instance the code instructions for displaying and scanning the object 118, un-skew captured images, converting captured images to 3D images, enabling wired or wireless device communications (where applicable), enabling video conferencing etc.

The computer system 600 comprises a processing unit 602 (i.e. the processing unit described earlier) for processing the one or more computer programs, and includes input modules such as cameras 636 and 638 (i.e. cameras 104 and 106 in FIG. 1), an optional keyboard/keypad/mouse 604, and/or a plurality of output devices such as a display 608 (i.e. screen 110 in FIG. 1), and printer 610 to facilitate interaction with the computer system 600.

The processing unit 602 may be connected to a computer network 612 via a suitable transceiver device 614 (i.e. a network interface), to enable access to e.g. the Internet (112 in FIG. 1) or other network systems such as a wired Local Area Network (LAN) or Wide Area Network (WAN). The processing unit 602 may also be connected to one or more external wireless communication enabled devices 634 via a suitable wireless transceiver device 632 e.g. a WiFi transceiver, Bluetooth module, Mobile telecommunication transceiver suitable for Global System for Mobile Communication (GSM), 3G, 3.5G, 4G telecommunication systems, and the like.

The processing unit 602 in the example includes a processor 618, a Random Access Memory (RAM) 620 and a Read Only Memory (ROM) 622. The processing unit 602 also includes a number of Input/Output (I/O) interfaces, for example I/O interface 624 to the display 608, and I/O interface 626 to the cameras 636, 638 and the optional keyboard/keypad/mouse keyboard 604.

The components of the processing unit 602 typically communicate via an interconnected bus 628 and in a manner known to the person skilled in the relevant art.

The computer programs may include one or more software applications for e.g. instant messaging platform, audio/video playback, video conferencing tools, internet accessibility, operating the computer system 600 (i.e. operating system), network security, file accessibility, database management, which are applications typically equipped on a video conferencing device, a desktop or portable computer. The computer programs may be supplied to the user of the computer system 600 encoded on a data storage medium such as a DVD-ROM, CD-ROM, and the like, on a flash memory carrier or a Hard Disk Drive, and for DVD-ROM and CD-ROM, to be read using a corresponding data storage medium drive of a data storage device 630, and for the flash memory carrier or Hard Disk Drive, to be read through a connection such as Serial ATA or USB respectively, and the like. Such application programs may also be downloaded from the computer network 612. The application programs are read and controlled in its execution by the processor 602. Intermediate storage of program data may be accomplished using RAM 620.

In other example embodiments, the device 100 described earlier with reference to the earlier figures may be mounted with one or more laser pointers. The laser pointers are used to mark out the working surface 116 by illuminating the corners and/or the boundaries of the working surface 116. They facilitate the placement of a paper document in the working surface 116 for scanning. The laser pointers may replace other ways of facilitating document placement, such as using the feet (304 and 306 in FIG. 3) of the device 100 described earlier with reference to FIG. 3.

Figure 7:
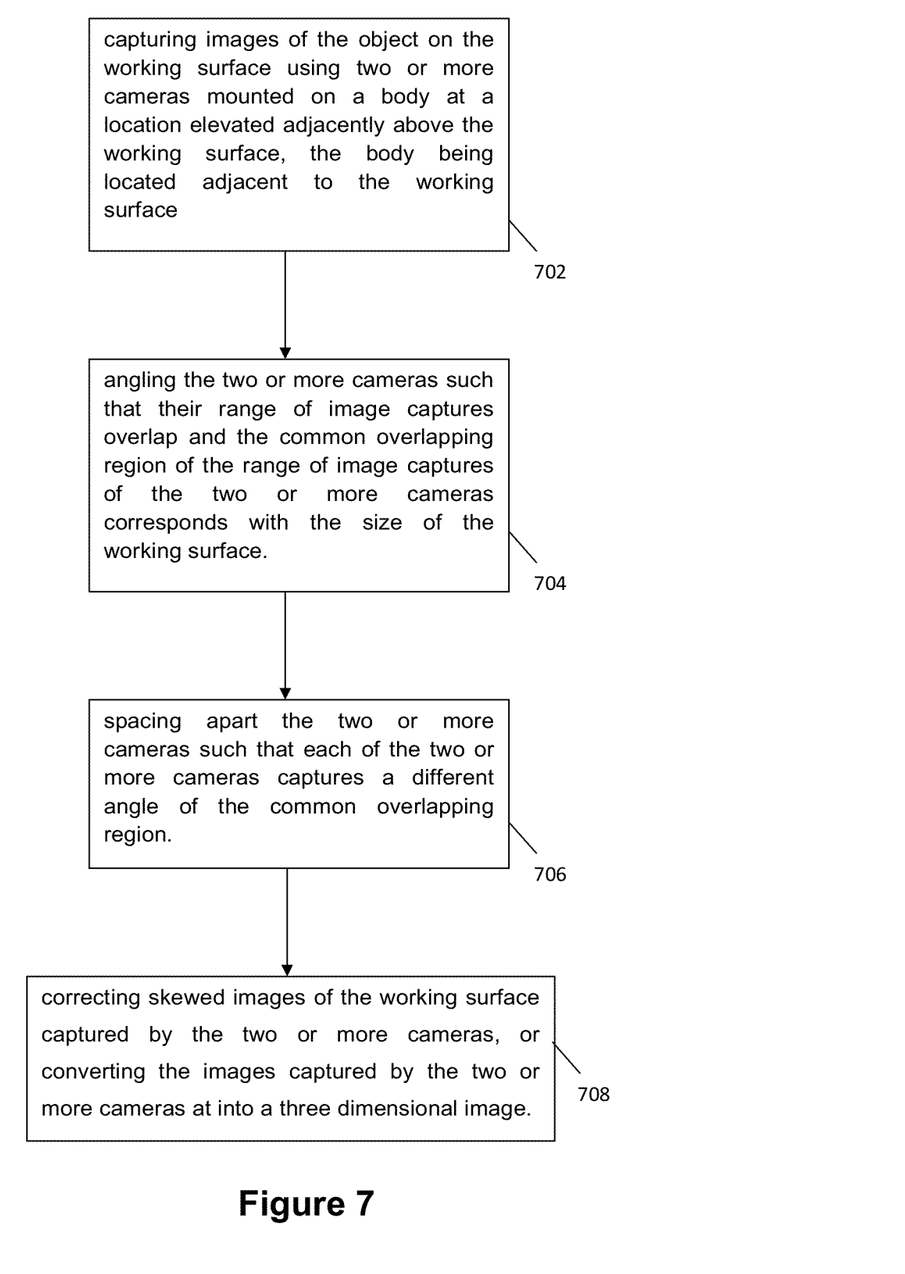
FIG. 7 is a flowchart of a method of an example embodiment of the present invention.

With reference to FIG. 7, generally, the steps of the method of operation of the example embodiment for scanning an object (e.g. 118 in FIG. 1, 502 and 506 in FIG. 5) on a working surface (e.g. 116 in FIGS. 1 and 5) as described with reference to the preceding figures are as follow.

At step 702, capturing images of the object (e.g. 118, 502 and 506) on the working surface (e.g. 116) using two or more cameras (e.g. 104 and 106) mounted on a body (e.g. 102) at a location elevated adjacently above the working surface (e.g. 116), the body (e.g. 102) being located adjacent to the working surface (e.g. 116).

At step 704, angling the two or more cameras (e.g. 104 and 106) such that their range of image captures overlap and the common overlapping region (e.g. 116) of the range of image captures of the two or more cameras (e.g. 104 and 106) corresponds with the size of the working surface (e.g. 116).

At step 706, spacing apart the two or more cameras (e.g. 104 and 106) such that each of the two or more cameras (e.g. 104 and 106) captures a different angle of the common overlapping region (e.g. 116).

At step 708, correcting skewed images of the working surface (e.g. 116) captured by the two or more cameras (e.g. 104 and 106), or converting the images captured by the two or more cameras (e.g. 104 and 106) at into a three dimensional image.

Many modifications and other embodiments can be made to the device and method for scanning objects on a working surface and the methodologies herein described by those skilled in the art having the understanding of the above described disclosure together with the drawings. Therefore, it is to be understood that the device and method for scanning objects on a working surface and its utility is not to be limited to the above description contained herein only, and that possible modifications are to be included in the claims of the disclosure.

What is claimed is:

1. A device for scanning an object on a working surface, the device comprising:
   a body located adjacent to the working surface;
   two or more cameras mounted on the body at a location elevated adjacently above the working surface for capturing images of the object on the working surface,
   the two or more cameras being angled such that their range of image captures overlap and the common overlapping region of the range of image captures of the two or more cameras corresponds with the size of the working surface,
   the two or more cameras being spaced apart such that each of the two or more cameras captures a different angle of the common overlapping region; and
   a processing unit capable of correcting skewed images of the working surface captured by the two or more cameras and converting the images captured by the two or more cameras into a three dimensional image.

2. The device as claimed in claim 1, wherein the two or more cameras are spaced apart from one another and disposed along a horizontal axis substantially parallel to the working surface, wherein the two or more cameras are pivotable synchronously about the device and rotatable synchronously about the horizontal axis.

3. The device as claimed in claim 1, the device comprising one or more feet located at the bottom of the body where the device rests on, the one or more feet being use as markers to facilitate the alignment of a document on the working surface for scanning.

4. The device as claimed in claim 1, the device further comprising:
   an indicia located on the body to indicate the position to place the midpoint of a document on the working surface for scanning.

5. The device as claimed in claim 1, the body of the device comprising:
   a screen for displaying the captured images of the object, the screen comprising screen markers for assisting alignment of the object in the captured images.

6. The device as claimed in claim 1, wherein the two or more cameras are spaced apart by substantially 6.35 cm.

7. The device as claimed in claim 1, wherein the two or more cameras are arranged to capture part of a lower portion of the body adjacent to the working surface to provide reference for the processing unit to identify the working surface for correcting skewed images.

8. The device as claimed in claim 7, wherein the lower portion of the body adjacent to the working surface is of a uniform colour.

9. The device as claimed in claim 1, wherein the two or more cameras are configurable to capture images of documents in portrait or landscape arrangement on the working surface.

10. The device as claimed in claim 1, the two or more cameras being substantially identical.

11. The device as claimed in claim 1, the device comprising a sound producing device for producing sound when there is alignment of objects in the working surface.

12. The device as claimed in claim 1, the device comprising a laser pointer for marking out the working surface to facilitate placement of the object.

13. A method for scanning an object on a working surface, the method comprising:
   capturing images of the object on the working surface using two or more cameras mounted on a body at a location elevated adjacently above the working surface, the body being located adjacent to the working surface;
   angling the two or more cameras such that their range of image captures overlap and the common overlapping region of the range of image captures of the two or more cameras corresponds with the size of the working surface;

spacing apart the two or more cameras such that each of the two or more cameras captures a different angle of the common overlapping region; and correcting skewed images of the working surface captured by the two or more cameras, or converting the images captured by the two or more cameras at into a three dimensional image.

14. The method as claimed in claim 13, the method further comprising:

spacing apart the two or more cameras from one another and disposing them along a horizontal axis substantially parallel to the working surface, wherein the two or more cameras are pivotable synchronously about the device and rotatable synchronously about the horizontal axis.

15. The method as claimed in claim 13, the method further comprising:

facilitating the alignment of a document on the working surface for scanning using one or more feet located at the bottom of the body.

16. The method as claimed in claim 13, the method further comprising:

indicating the position to place the midpoint of a document on the working surface for scanning using indicia located at the foot of the body.

17. The method as claimed in claim 13, the method further comprising:

displaying the captured images of the object on a screen; and assisting alignment of the object in the captured images using screen markers on the screen.

18. The method as claimed in claim 13, the method further comprising:

spacing apart the two or more cameras by substantially 6.35 cm.

19. The method as claimed in claim 13, the method further comprising:

arranging the two or more cameras to capture part of a lower portion of the body adjacent to the working surface to provide reference for the processing unit to identify the working surface for correcting skewed images.

20. The method as claimed in claim 19, wherein the lower portion of the body adjacent to the working surface is of a uniform colour.

21. The method as claimed in claim 13, the method further comprising:

configuring the two or more cameras to capture images of documents in portrait or landscape arrangement on the working surface.

22. The method as claimed in claim 13, wherein the two or more cameras are substantially identical.

23. The method as claimed in claim 13, the method further comprising:

producing sound when there is alignment of objects in the working surface.

24. The method as claimed in claim 13, the method further comprising:

facilitating placement of the object by marking out the working surface using a laser pointer.

* * * * *